June 27, 1967 R. J. ARAUJO ETAL 3,328,182
PHOTOTROPIC GLASS ARTICLE AND METHOD
Filed June 24, 1963
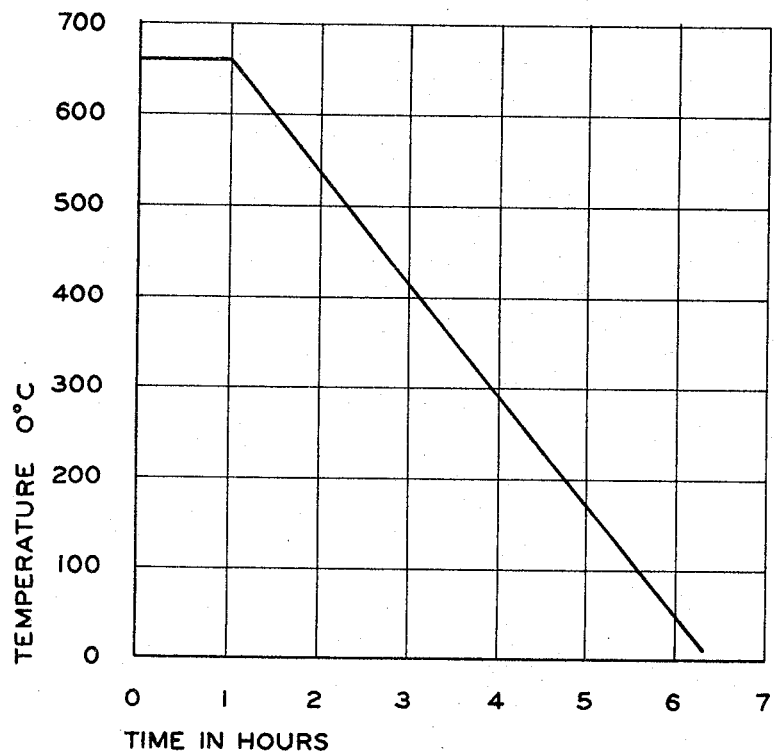
INVENTORS
Roger J. Araujo, Richard A. Eppler, Evelyn F. Krause
BY Clarence R. Patty, Jr.
ATTORNEY 3,328,182
PHOTOTROPIC GLASS ARTICLE AND METHOD
Roger J. Araujo, Corning, Richard A. Eppler, Painted Post, and Evelyn F. Krause, Horseheads, N.Y., assignors to Corning Glass Works, Corning, N.Y., a corporation of New York
Filed June 24, 1963, Ser. No. 289,898
7 Claims. (Cl. 106—54)

This invention relates to the production of phototropic glass articles. More particularly, this invention relates to phototropic glass articles which exhibit very rapid reversibility of optical transmittance.

A detailed discussion of the hypothesized mechanism involved in the process of phototropicity in glass articles is set out in the co-pending United States application, Serial No. 213,634, now U.S. Patent No. 3,208,860, by W. H. Armistead and S. D. Stookey. In brief, a phototropic glass is defined as one having an optical transmittance which varies reversibly with the intensity of exposure of actinic radiation thereto, i.e., such a glass darkens in the presence of actinic radiation and regains its original transmittance upon the removal of the impinging radiation. This reversibility of optical transmittance which forms the basis of phototropicity sets these glasses apart from the well known photosensitive glasses of commerce which can be darkened irreversibly by means of exposure to ultraviolet radiation followed by a predetermined heat treatment.

Armistead and Stookey disclose inorganic silicate glasses having submicroscopic, radiation-sensitive crystals dispersed in at least a portion thereof which become dark in color when exposed to actinic radiation but which return to their original color when removed from the incident radiation. The transparency of these glasses to visible radiation, then, can be varied reversibly by the amount of actinic radiation to which they are exposed. It has been postulated that this phenomenon is due to some kind of a reaction between the actinic radiation and the submicroscopic crystals distributed in the glassy matrix which alters the absorptive characteristics of the crystals with respect to radiations in the visible part of the spectrum. Since these crystals are dispersed in an amorphous or glassy matrix which is impermeable to and non-reactive with the products formed during this reaction with the incident radiation, the removal of the actinic radiation allows the crystals to regain their original state. This impermeability and inertness of the glassy matrix, as contrasted with the organic emulsion of photographic film, is believed to form the basis for the apparent autogenous reverse reaction whereby the crystals return to their original state. In other words, the products of reaction cannot diffuse away but are retained in place. Glasses exhibiting phototropic behavior have been utilized in windows, wall panels, ophthalmic lenses, and other applications where the ability to transmit more or less visible light depending upon the amount of actinic radiation incident thereon was important.

The inorganic silicate glasses disclosed by Armistead and Stookey as preferred compositions comprise glasses in the system $R_2O \cdot B_2O_3 \cdot Al_2O_3 \cdot SiO_2$ where $R_2O$ represents the alkali metal oxides. These glasses can be made phototropic through the inclusion of silver and at least one halogen selected from the group consisting of chlorine, bromine and iodine. The base glasses, then, consist essentially, by weight, of about 40–76% $SiO_2$, 4–26% $Al_2O_3$, 4–26% $B_2O_3$, and at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$. The radiation-sensitive crystallization is developed through the addition to the base glass of at least one halogen in the indicated minimum effective proportion, by weight, of 0.2% chlorine, 0.1% bromine and 0.08% iodine and a minimum of silver in the indicated effective proportion, by weight, of 0.2% in a glass wherein the effective halogen is chlorine, 0.05% in a glass containing at least 0.1% bromine but containing less than 0.08% iodine, and 0.03% in a glass containing at least 0.08% iodine. The sum of the base glass constituents, the silver, and the effective halogen comprises at least 85% of the total glass composition. Very small amounts of low-temperature reducing agents such as $SnO$, $FeO$, $Cu_2O$, $As_2O_3$ and $Sb_2O_3$ may be included to improve the phototropic characteristics of the glass. Additions of fluorine, $P_2O_5$, and certain bivalent metal oxides such as $MgO$, $CaO$, $BaO$, $SrO$, $ZnO$, and $PbO$ are also possible to improve the melting, chemical durability, strength, and other properties of the glass composition.

The general method of producing phototropic articles of glass is also explained fully in the above-identified patent application. Thus, the batch ingredients are compounded together, melted, shaped by means of conventional glassworking techniques such as blowing, casting, drawing, pressing, rolling, etc., wherein the melt is quenched to a glass of the desired configuration, and the essential radiation-sensitive crystallization of silver halide developed during the shaping and cooling process or by a subsequent heat treatment.

Such glasses have exhibited satisfactory reversibility of optical transmittance when exposed to and later removed from radiations of wave lengths within the range of about 0.3–0.55 micron (3000–5500 A.), i.e., radiations of ultraviolet light and into about the middle of the visible range of the spectrum. Thus, optical transmittances as low as 5% have been attained when such glasses have been exposed to sunlight and their original transmittance regained during the overnight darkness. This manner of reversibility of optical transmittance has proved to be one shortcoming of these glasses which is particularly vital in certain applications. Hence, it will be appreciated that when used as windowpanes in homes, office buildings, and the like, the rate of fading of the darkened glass to its original transmittance is not very important. Thus, a period of one hour, two hours, or even more, after sundown until complete return to original transmittance is effected is usually not critical. However, in certain applications, particularly ophthalmic lenses, very rapid fading is desirable. By their very nature, these glasses darken very rapidly and generally exhibit minimum transmittance within a few minutes. The wearer of eye glasses for his comfort and even his safety demands very rapid fading in order to accommodate to the various environments which he may encounter during the day. Thus, a glass requiring as little as 20 minutes to return to the vicinity of its original transmission can be an irritation to a person entering a building from a bright sunny day and may even be a hazard due to the wearer's temporarily reduced vision. The presently available sunglasses of commerce having a single optical transmission which is quite low are ordinarily removed by the wearer when coming into a darker environment.

Therefore, the principal object of this invention is to provide a glass exhibiting phototropic behavior which is particularly useful in ophthalmic lenses and other applications wherein fast fading is of importance such as windows for airport control towers and windshields for automobiles.

Another object of this invention is to provide a glass possessing phototropic properties which exhibits very rapid fading to its original optical transmission when removed from actinic radiation.

Still another object of this invention is to provide a method of making a glass possessing phototropic properties which exhibits very rapid fading to its original optical transmittance when removed from actinic radiation.

Other objects will become apparent from the following description and the accompanying graph which represents a time-temperature graph of the preferred heat treating procedure.

We have discovered that the above objects can be obtained through the doping of the glass compositions set forth by Armistead and Stookey in Serial No. 213,634 with cadmium oxide, expressed as CdO. The term "doping" has been borrowed from the art dealing with semiconductors, where it has been defined as the addition of impurities, i.e., materials other than the base components, to the base composition to produce a deviation from stoichiometric composition in order to achieve a desired composition. The analogy drawn with respect to phototropic glass articles contemplates the addition of very minor amounts of CdO to a potentially phototropic glass composition, such addition interposing itself in the crystal structure of the radiation-sensitive crystals present in the glass but not forming a separate or definable crystal per se but which greatly increases the fading rate of the radiation-sensitive crystals when the actinic radiation is removed. Hence, the CdO is equated to the "impurity" known in the semiconductor art. An investigation of the doped radiation-sensitive crystallization by means of electron micrographs from a type EMU 3-B electron microscope designed by the Radio Corporation of America has shown no discernible difference in the structure of the silver halide and, even more importantly, has shown no crystallization present other than the silver halide.

In a co-pending patent application of Roger J. Araujo, one of the inventors herein, Serial No. 278,323, filed May 6, 1963, is described the production of silver-free, phototropic glass bodies wherein the radiation-sensitive crystallization consists of copper and/or cadmium halides. In that application, sufficient cadmium and/or copper oxide was added to the base glass composition to develop effective crystallization of cadmium and/or copper halides upon proper heat treatment. Such crystallization produced satisfactory phototropicity in the glass and exhibited better proportionality to the intensity of the incident actinic radiation than the silver halide sensitized glasses of Armistead and Stookey, i.e., the darkening in the glass varied in more direct proportion to the intensity of the incident radiation. However, the fading times of these glasses, while very satisfactory in most applications, was not as rapid as would be desirable in ophthalmic lenses.

In an attempt to improve the proportionality of silver halide glasses to the intensity of incident actinic radiation through the development of cadmium and/or copper halide crystals therewith, we discovered that the addition of a very minor amount of cadmium oxide, expressed as CdO, i.e., about 0.04–0.3% by weight, will improve the fading rate of the darkened glass to such an extent as to render it practical for ophthalmic ware. As the time of fading is an exponential function, the fading beginning rapidly and tapering off with an increase in time, a measure of the fading rate of the darkened glass or its ability to regain is original transmission has been arbitrarily represented as the half-fading time ($h_{ft}$), i.e., the time in seconds in which the concentration of color centers after exposure to actinic radiation is one-half that immediately after the exposure to actinic radiation. Half-fading times of less than 1 minute and as brief as 20 seconds can be attained with the products of our invention. It is readily apparent that such fading times are sufficiently short to make the glasses of this invention suitable for ophthalmic lenses. Thus, the return to the original optical transmittance of the glass following removal of the incident actinic radiation is of such rapidity that the inconvenience of removing one's spectacles when entering a room from the sunny outdoors, inherent in the present sunglasses of commerce, is virtually eliminated. The fading time is so brief that substantially no awareness of this fading may be felt on the part of the wearer of the spectacles.

We have discovered that our doping technique is applicable to any silicate glass which can be made phototropic through the development of silver halide crystals in at least a portion thereof selected from the group consisting of silver chloride, silver bromide, and silver iodide. Our preferred glass compositions are those stated by Armistead and Stookey hereinabove to be the most desirable. As the added cadmium oxide does not appear to cause any new crystallization but is merely an impurity in the silver halide crystal, the general properties of phototropicity in the glasses of the invention are similar to those disclosed by Armistead and Stookey. Thus, the glasses become darker in color upon exposure to actinic radiation of wavelengths between about 0.3–0.55 micron (3000–5500 A.). Also, an article which is both transparent and phototropic can be made from a silicate glass containing such crystals in a concentration of not more than about 0.1% by volume and are not more than about 0.1 micron in diameter. Hence, although the concentration and size of the crystals may be considerably greater than the limits set out above and the glass will continue to exhibit phototropic behavior, provided the crystals are completely surrounded by glass to prohibit permanent change therein upon exposure to actinic radiation, such greater concentrations and/or crystal dimensions form translucent or opalized glasses which, of course, are not functional as ophthalmic lenses. It is postulated that the transparent glasses contain a sufficient amount of crystallization of such small size to have a discernible effect upon the absorption of visible radiation but to have no substantial scattering effect upon such radiation. The concentrations and sizes of the developed crystals producing the necessary sensitivity in translucent or opal glasses may be measured by means of optical microscopy. However, such determinations in transparent glasses must be obtained utilizing an electron microscope such as was described above with relation to the study of the structure of the doped crystals.

The phototropic articles of this invention are made in accordance with the preferred procedure of Armistead and Stookey, i.e., the constituents of the base glass are mixed together with the components of the desired silver halide crystalline phase and cadmium oxide, this batch is then melted, and the desired crystals precipitated in situ in a glassy matrix during the forming and cooling steps or by means of a heat treatment applied to the shaped article. Such articles may be made from glass batches of the requisite composition in the conventional manner by melting in a crucible, pot or tank. It will be apparent that in order to obtain the minimum amount of necessary crystallization within the glass article sufficient batch materials must be utilized to obtain the desired concentration of doped silver halide crystals in the glass, as determined by conventional chemical analysis. As explained above, the addition of 0.04–0.3% by weight of cadmium oxide to the glass batch has a synergistic effect upon the fading rate of the darkened glass. A preferred range appears to be 0.05–0.12% by weight. This range of cadmium oxide is especially critical to the final phototropic behavior of the glass. Where less than about 0.04% by weight is present, the effect on the fading rate is small to negligible, while with additions of more than about 0.3% by weight the glass will not darken sufficiently when exposed to actinic radiation. As was noted by Armistead and Stookey, while there does not appear to be any critical maximum amount of silver and/or halogen which can be utilized, glasses containing an analyzed silver concentration greater than 0.7% by weight yield phototropic articles which are translucent or opalized and glasses containing an analyzed silver concentration in excess of 1.5% by weight do not appear to demonstrate any advantages increase in phototropic properties. Likewise, the total quantity of halogen should preferably be restricted to about 2% by weight for practical reasons. Finally, in order to insure the production of a transparent phototropic glass article, the analytically determined amount of silver and halogen should not exceed about 0.7 and 0.6 weight percent, respectively. We have found these features to be relevent with the doped crystals of our invention. Thus, the overall qualitative phototropic behavior of silver halide-sensitized glasses is not affected by the addition of cadmium oxide to the body in amounts of 0.04–0.3% by weight, but only the fading rate thereof is altered. The mechanism of this effect on the fading rate has not been explained and has been likened to the action of a catalyst.

As was explained above, the phototropic behavior of glass articles of this invention is the result of the precipitation or growth in situ of doped silver halide crystals encased within the glassy matrix. Such crystals can be precipitated during the cooling of the melt to a glass body. However, the melt can be cooled rapidly enough (quenched) so that no crystallites of the silver halide of the proper size, or an insufficient number thereof, are precipitated to cause a discernible phototropic effect in the glass. The quenched glass is thereafter heated to a temperature within the range 450°–1000° C., and preferably above the strain point of the particular glass (450°–475° C.) but below 900° C., for a sufficient time to allow the metal cations and the halide anions to move into closer proximity within the glass thereby forming a second amorphous phase comprising submicroscopic droplets of molten silver halide which will crystallize upon cooling below the melting point of the respective silver halide. Generally, the glass body should not be heated to a temperature substantially above the softening point of the glass during this heat treating step, as such would be likely to cause excessive deformation of the glass shape unless it is adequately supported by auxiliary means during the heat treatment. It will be appreciated, however, that some methods of shaping glass inherently contemplate a thermal deformation of the glass body and here, perhaps, the heat treating step could be incorporated therewith. In any event, thermal deformation becomes intolerable at temperatures above 1000° C. Because a more even growth of crystals is possible by means of the steps of quenching the melt to a glass body followed by the heat treatment of said body than through the precipitation of crystals during the actual cooling of the melt, this method is generally preferred. Such controlled development of crystals also results in a more homogeneous dispersion of the crystals within the glassy matrix and more uniform sizing of the crystals themselves. The movement of the crystals proceeds more readily at higher temperatures principally because the viscosity of the glassy matrix decreases with an increase in temperature, thereby lessening the resistance to movement necessary to accomplish the rearrangement of the metal cations and halide anions. Hence, a short exposure at a high temperature will produce as complete a rearrangement as that accomplished through an extended exposure at a lower temperature. By way of illustration rather than limitation, I have found that, in most instances, subjecting the glass body to a temperature of about 450° C. for 24–48 hours will result in a satisfactorily phototropic body. Exposures at higher temperatures substantially shorten the holding period required such that at the softening point of the glass only about ¼–3 hours will suffice and at 1000° C. periods of 5 minutes and less have produced an adequate development of crystals. Nonetheless, since there are other reactions which can possibly occur during this heat treatment such as agglomeration and growth of the metal halide droplets and/or the precipitation of other crystal phases, it has been deemed necessary to limit the dwell time of heat treatment in the higher extreme of the operable range to prevent the occurrence of these undesirable side reactions.

Table I records examples having compositions circumscribed within the aforementioned ranges as analyzed on the oxide basis in weight percent. The batch components may comprise any materials, either oxides or other compounds, which, on being melted together, are converted to the desired oxide compositions in the requisite proportions. Although it has been determined that at least a substantial portion, if not all, of the silver is present in the glass as ions thereof, presumably having bonds with oxygen and/or the halogens and not as metallic silver, it is expression in Table I as the metal itself in accordance with conventional practice.

The glasses described in Table I can be produced by melting batches in the conventional manner wherein allowance is provided for volatilization of the halogens and silver which may range as high as 50% for the halogens and 30% for the silver depending upon the type of melting unit utilized, the batch ingredients employed, and the melting time and temperature. Articles were formed from the glass compositions set forth in Table I by compounding the batch ingredients in the proper proportions to produce the desired glass, having made a predetermined allowance for the volatilization of halogen and silver, ball milling these ingredients together to insure a homogeneous melt, and then melting the batch in a tank at a temperature of about 1350° C. for about 6 hours. The melt was then pressed into conventional blanks for ophthalmic lenses which were subsequently cooled to room temperature following a conventional annealing schedule for a visual inspection as to glass quality. The quenching effect produced by pressing the molten glass into ophthalmic blanks was sufficient to preclude the precipitation of any crystallization producing phototropicity. The plates were subsequently heat treated to induce a controlled development of radiation-sensitive crystals. It must be appreciated, however, that the ophthalmic blank may merely be quenched to the transformation point of the glass, i.e., that temperature at which the melt is considered to have become an amorphous solid, generally in the vicinity of the annealing point of the glass, and then subjected to heat treatment.

TABLE I

|  | 1 | 2 | 3 | 4 | 5 | 6 | 7 |
|---|---|---|---|---|---|---|---|
| SiO$_2$ | 58.75 | 58.70 | 59.52 | 59.11 | 59.13 | 59.14 | 59.12 |
| Al$_2$O$_3$ | 9.00 | 9.00 | 9.13 | 9.06 | 9.05 | 9.05 | 9.05 |
| B$_2$O$_3$ | 20.00 | 20.00 | 20.28 | 20.14 | 20.15 | 20.13 | 20.15 |
| Na$_2$O | 10.00 | 10.00 | 10.14 | 10.07 | 10.07 | 10.06 | 10.06 |
| Ag | 0.18 | 0.18 | 0.13 | 0.13 | 0.14 | 0.14 | 0.14 |
| Cl | 0.55 | 0.55 | 0.34 | 0.36 | 0.36 | 0.37 | 0.35 |
| Br | 0.05 | 0.10 | 0.04 | 0.07 | 0.06 | 0.06 | 0.05 |
| F | 1.35 | 1.35 | 0.80 | 0.86 | 0.88 | 0.89 | 0.90 |
| CuO | 0.016 | 0.016 | 0.017 | 0.026 | 0.016 | 0.016 | 0.016 |
| CdO | 0.10 | 0.10 | 0.04 | 0.13 | 0.12 | 0.12 | 0.11 |

|  | 8 | 9 | 10 | 11 | 12 | 13 | 14 |
|---|---|---|---|---|---|---|---|
| SiO$_2$ | 59.10 | 59.05 | 58.75 | 58.75 | 60.76 | 58.67 | 60.59 |
| Al$_2$O$_3$ | 9.07 | 9.05 | 9.00 | 9.00 | 9.20 | 9.60 | 9.40 |
| B$_2$O$_3$ | 20.13 | 20.12 | 20.00 | 20.00 | 18.25 | 20.00 | 17.76 |
| Na$_2$O | 10.08 | 10.06 | 10.00 | 10.00 | 10.54 | 10.00 | 10.53 |
| Ag | 0.14 | 0.13 | 0.18 | 0.18 | 0.12 | 0.15 | 0.12 |
| Cl | 0.37 | 0.42 | 0.55 | 0.55 | 0.44 | 0.60 | 0.42 |
| Br | 0.07 | 0.06 | 0.10 | 0.10 | 0.18 |  | 0.05 |
| F | 0.84 | 0.88 | 1.35 | 1.35 |  | 1.35 |  |
| CuO | 0.027 | 0.028 |  | 0.016 |  | 0.032 |  |
| CdO | 0.14 | 0.17 | 0.05 | 0.05 | 0.07 | 0.20 | 0.09 |
| K$_2$O |  |  |  |  | 1.03 |  |  |
| As$_2$O$_3$ |  |  |  |  |  |  | 1.10 |

TABLE I.—Continued

| | 15 | 16 | 17 | 18 | 19 | 20 |
|---|---|---|---|---|---|---|
| $SiO_2$ | 60.18 | 60.59 | 61.02 | 58.74 | 58.75 | 58.78 |
| $Al_2O_3$ | 9.37 | 9.20 | 9.30 | 9.00 | 9.00 | 9.00 |
| $B_2O_3$ | 18.37 | 18.31 | 18.44 | 20.00 | 20.00 | 20.00 |
| $Na_2O$ | 10.13 | 10.32 | 10.37 | 10.00 | 10.00 | 10.00 |
| Ag | 0.16 | 0.12 | 0.11 | 0.18 | 0.16 | 0.18 |
| Cl | 0.18 | 0.12 | 0.41 | 0.40 | 0.15 | 0.55 |
| Br | 0.15 | 0.15 | 0.18 | 0.10 | 0.26 | 0.10 |
| F | | | | 1.35 | 1.35 | 1.35 |
| CuO | | | | 0.032 | 0.030 | 0.016 |
| CdO | 0.04 | 0.16 | 0.14 | 0.20 | 0.34 | 0.03 |
| $K_2O$ | 1.11 | 1.03 | 1.06 | | | |
| $As_2O_3$ | 0.13 | 0.15 | | | | |

Table II records the heat treating schedules utilized in developing phototropicity in the glass bodies and sets forth the phototropic properties resulting through such heat treatment. The rate of heating employed in raising the temperature of the glass bodies from room temperature to that of the heat treatment does not, in most instances, appear to critically affect the results. Hence, the glass articles may be plunged directly into a furnace maintained at the desired heat treating temperature, if the size and shape of the body is such that breakage due to thermal shock does not occur, and, likewise, removed directly therefrom to cool to room temperature. It is apparent, then, that the glass articles may be heated to the predetermined temperature at substantially any rate at which the furnace can be controlled. Finally, the articles may be cooled to useful bodies at substantially any rate and may conveniently be cooled by merely cutting off the heat to the furnace and allowing it to cool at its own rate with the article retained therein. For ophthalmic applications, we, in general, prefer to cool the glasses slowly, i.e., less than about 2° C./minute to at least 75° C. below the strain point of the glass. However, while the particular cooling rate per se appears to have but a limited effect on the specific phototropic properties of the glass, it is our preferred practice to utilize approximately the same cooling rate in matching applications so as to obtain identical phototropic behavior therein.

Each of the ophthalmic blanks was ground and polished to a 2 mm. thickness. In Examples 1–13, these plates were simply plunged into a furnace set at the indicated temperature, held thereat for a period of time sufficient to precipitate the desired radio-sensitive crystals, and then the heat to the furnace was cut off and the furnace allowed to cool to room temperature at its own rate. In Examples 14–17, a higher crystallization temperature was utilized and thermal breakage became a problem when the articles were plunged directly into the furnace. Therefore, the glass plates were placed into a furnace at room temperature, heated at about 5° C./minute to the desired temperature, maintained thereat for a time sufficient to develop the necessary submicroscopic crystals of cadmium-doped, silver halide, and then the power to the furnace cut off and the furnace allowed to cool at its own rate with the plates inside, this cooling rate averaging about 6° C./minute. Examples 18–20 were subjected to the unique heat treatments set forth in Table II.

A measure of the phototropic behavior of a glass can be demonstrated by determining its optical transmittance before and after exposure for a specified period to the above-mentioned actinic radiation and again after a specified time interval following the termination of this exposure. In Table II, $T_0$ represents the initial visible transmission, expressed in percent, of the glass after heat treatment but before exposure to actinic radiation. $T_6^M$ represents the optical transmission of the glass after an exposure of six minutes to ultra-violet radiation (3650 A.) produced by a commercial "Mineralite" long wave ultraviolet lamp having a 9-watt input, the output being filtered to remove a major proportion of the visible energy. Ultra-violet radiation has been discovered to be extremely effective in causing potentially phototropic glasses to exhibit this property. A six-minute exposure is arbitrarily considered to place the glass at equilibrium. $T_6^S$ represents the optical transmission of the glass after an exposure of six minutes to sunlight in Corning, New York between 12:00 noon and 12:06 P.M. $h_{ft}$ represents the above-defined half-fading time for each glass, expressed in seconds, after exposure to the "Mineralite" source.

TABLE II

| Ex. No. | Heat Treatment | $T_0$ | $T_6^M$ | $T_6^S$ | $h_{ft}$ |
|---|---|---|---|---|---|
| 1 | 475° C. for 24 hours | 92.0 | 45 | 35 | 30 |
| 2 | 550° C. for 16 hours | 91.5 | 42 | 29 | 28 |
| 3 | 575° C. for 10 hours | 91.7 | 32 | 25 | 60 |
| 4 | 600° C. for 4 hours | 90.6 | 27 | 23 | 24 |
| 5 | 660° C. for 1 hour | 92.0 | 32 | 20 | 22 |
| 6 | ——do—— | 91.3 | 25 | 15 | 18 |
| 7 | ——do—— | 91.2 | 24 | 9 | 20 |
| 8 | 700° C. for 1 hour | 90.8 | 20 | 7 | 30 |
| 9 | 660° C. for 1 hour | 90.5 | 55 | 49 | 32 |
| 10 | ——do—— | 91.8 | 9 | 5 | 58 |
| 11 | ——do—— | 92.3 | 12 | 6 | 40 |
| 12 | ——do—— | 91.7 | 10 | 6 | 50 |
| 13 | 600° C. for 1½ hours | 94.0 | 15 | 10 | 60 |
| 14 | 800° C. for ½ hour | 90.9 | 22 | 12 | 48 |
| 15 | 900° C. for ¼ hour | 92.2 | 33 | 26 | 60 |
| 16 | 950° C. for ⅙ hour | 90.6 | 52 | 47 | 50 |
| 17 | 1,000° C. for 1/20 hour | 91.1 | 40 | 39 | 46 |
| 18 | Heat at 8° C./min. to 640° C. Hold for 3 hours. Cool at 4° C./min. to 500° C. Cool at 1° C./min. to 350° C. Remove from furnace. | 94 | 42 | | 63 |
| 19 | Heat at 8° C./min. to 600° C. Hold for 1 hour. Heat at 8° C./min. to 660° C. Hold for 1 hour. Cool at 4° C./min. to 500° C. Cool at 1° C./min. to 400° C. Remove from furnace. | 93 | 42 | | 114 |
| 20 | Heat at 8° C./min. to 680° C. Hold for 1½ hours. Cool at 4° C./min. to 500° C. Remove from furnace. | 91 | 52 | | 109 |

Table II illustrates the phototropic behavior of the cadmium-doped, silver halide glasses of this invention. As was explained hereinabove, glasses having a half-fading time of one minute and less can be produced. This table shows, further, the criticality of the additions of cadmium oxide as a dopant. Hence, where less than about 0.04% or more than about 0.3% cadmium oxide is present, the half-fading time becomes longer than that deemed desirable for ophthalmic lenses, note Examples 19 and 20.

The preferred base glass compositions are those disclosed by Armistead and Stookey set out hereinabove, viz., glasses of the system $R_2O \cdot Al_2O_3 \cdot B_2O_3 \cdot SiO_2$, consisting essentially by weight of 40–76% $SiO_2$, 4–26% $Al_2O_3$, 4–26% $B_2O_3$, and $R_2O$ in the indicated proportion selected from the group consisting of 2–8% $Li_2O$, 4–15% $Na_2O$, 6–20% $K_2O$, 8–25% $Rb_2O$, and 10–30% $Cs_2O$, the sum of the recited base glass components, silver, and halogen being at least 85% of the total glass composition. Very minor amounts of low-temperature reducing agents, generally less than 1% by weight, can be beneficial in improving the phototropic properties of some of the glasses. Minor amounts of fluorine and $P_2O_5$ can be added to the glass batch to improve its melting characteristics and inhibit devitrification upon cooling. Although silver fluoride crystals have not been detected within the precipitated phase, the amount of fluorine is kept low to forestall the precipitation of other crystalline fluorides within the glass. The $P_2O_5$ content, likewise, is kept low so that its effect as an oxidizing agent is minimized. The presence of the above-mentioned bivalent metal oxides should be limited to not more than about 4% MgO, 6% CaO, 7% SrO, 8% BaO, and 8% ZnO, on a weight basis, the total amount of these components not exceeding 15% by weight of the glass composition. For glasses of the highest transparency, these optical components are preferably absent or present in but very small quantities. Contrary to the teachings of Armistead and Stookey, we have discovered that the presence of lead acts as a poison on the effect of cadmium doping and, therefore, cannot be tolerated in these glasses.

The accompanying drawing represents a time-temperature graph setting forth our preferred heat treating schedule which is utilized with Examples 5, 6, 7 and 9–12. In this procedure, after the batch has been melted, shaped, and cooled to room temperature, the glass articles are plunged into a furnace maintained at 660° C., held thereat for one hour, and then the heat cut off of the furnace, allowing the furnace to cool at its own rate to room temperature (about 2° C./minute) with the article retained therein.

What is claimed is:

1. A phototropic article comprising a body of a silicate glass having in at least a portion thereof crystals of at least one cadmium-doped silver halide selected from the group consisting of silver chloride, silver bromide, and silver iodide, said portion of the glass containing by weight on the analyzed basis, 0.04–0.3% CdO.

2. A phototropic article comprising a body of a silicate glass having in at least a portion thereof crystals of at least one cadmium-doped silver halide selected from the group consisting of silver chloride, silver bromide, and silver iodide, said portion of the glass containing by weight on the analyzed basis at least one halogen in the indicated minimum effective proportion of 0.2% chlorine, 0.1% bromine, and 0.08% iodine, a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, and 0.04–0.3% CdO.

3. A glass composition which is potentially phototropic comprising in weight percent on the analyzed basis 40–76% $SiO_2$, 4–26% $Al_2O_3$, 4–26% $B_2O_3$, at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, at least one halogen in the indicated minimum effective proportion of 0.2% chlorine, 0.1% bromine, and 0.08 iodine, a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, the sum of the recited base glass constituents, silver, and halogens being at least 85% of the total glass composition, and 0.04–0.3% CdO.

4. A method of making a phototropic glass article which comprises the steps of melting a batch for a silicate glass composition, said glass composition containing, by weight on the analyzed basis, at least one halogen in the indicated minimum effective proportion of 0.2% chlorine, 0.1% bromine, and 0.08% iodine, a minimum of silver in the indicated proportion of 0.2% in a glass wherein the effective halogen consists of chlorine, 0.05% in a glass containing at least 0.1% bromine but less than 0.08% iodine, and 0.03% in a glass containing at least 0.08% iodine, and 0.04–0.3% CdO, cooling the melt and forming a glass article therefrom, subsequently heat treating said glass article at a temperature from about 450°–1000° C. for a time sufficient to precipitate submicroscopic crystals of radiation-sensitive material, and thereafter cooling said article to room temperature.

5. The method according to claim 4 wherein the temperature of heat treatment ranges between the strain point of said glass and 900° C.

6. The method according to claim 4 wherein the time sufficient to precipitate submicroscopic crystals of radiation-sensitive material ranges from about 48 hours at 450° C. to about 2 minutes at 1000° C.

7. The method according to claim 4 wherein the submicroscopic crystals of radiation-sensitive material consist of at least one cadmium-doped silver halide selected from the group consisting of silver chloride, silver bromide, and silver iodide.

References Cited

UNITED STATES PATENTS 3,208,860    9/1965    Armistead et al. _____ 106—54

OTHER REFERENCES

Brown, Phototropy—A Literature Review, WADC Technical Report 59–436, December 1959, p. 20.

HELEN M. McCARTHY, *Primary Examiner.*